United States Patent [19]

Iseard

[11] Patent Number: 4,465,963
[45] Date of Patent: Aug. 14, 1984

[54] BATTERY CHARGING SYSTEM UTILIZING OPTICAL GAS SENSOR

[75] Inventor: Barry S. Iseard, Freeport, The Bahamas

[73] Assignee: Oakwood Energy Group, Inc., Dayton, Ohio

[21] Appl. No.: 441,171

[22] Filed: Nov. 12, 1982

[51] Int. Cl.³ .............................................. H02J 7/04
[52] U.S. Cl. ....................................... 320/46; 320/53; 250/206
[58] Field of Search ..................... 320/46, 53, DIG. 1, 320/DIG. 2; 250/200, 205, 206, 211 R, 232, 573; 307/252 N

[56] References Cited

U.S. PATENT DOCUMENTS 3,281,640 10/1966 Mas .
3,460,019 8/1969 Mas .
3,584,285 6/1971 Goodkin et al. .
3,919,622 11/1975 Al Nema et al. ............... 307/252 N
4,203,065 5/1980 Whitford .
4,260,943 4/1981 Zaderej et al. .

Primary Examiner—William M. Shoop
Assistant Examiner—Anita M. Ault
Attorney, Agent, or Firm—Cushman, Darby & Cushman

[57] ABSTRACT

A battery charging system utilizing a gas pressure transducer which increases in resistance in response to increased gas pressure. The gas pressure transducer comprises an optical transducer. Respective rubber diaphragm chambers, communicating with the cells through glass and plastic tubing, are disposed to form a channel therebetween. A light bulb and a photo-resistor are placed at the respectve ends of the channel. Increased gas pressure from the cells forces the centers of the diaphragm closer together to restrict the channel region, and thus decrease the light received by the photo-resistor as a function of gas pressure. In addition, a timing circuit utilizing the transistor for control of an SCR switch is disclosed.

5 Claims, 3 Drawing Figures

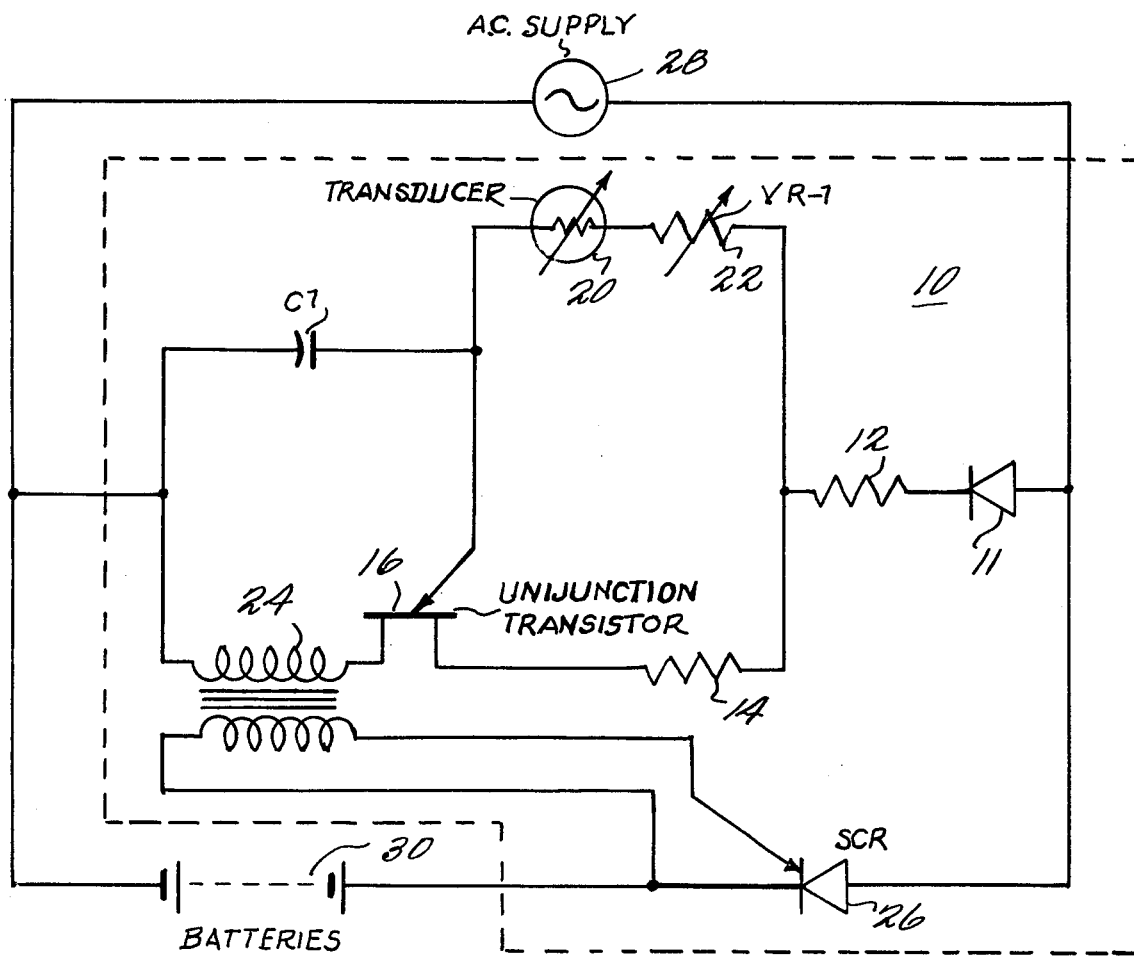
F I G. 2

4,465,963

BATTERY CHARGING SYSTEM UTILIZING OPTICAL GAS SENSOR

FIELD OF THE INVENTION

The present invention relates to battery charging systems and, more specifically, to a battery charging system wherein the charging rate is regulated in accordance with gas pressure produced by the cells during the charging process.

BACKGROUND OF THE INVENTION

Battery cells utilizing an aqueous electrolyte, such as, for example, cells containing lead and lead oxide electrodes in a sulfuric acid electrolyte (lead acid cells) are charged by passing a current between the electrodes thereof. During charging, the active materials of the battery are redeposited on the electrodes. In a lead acid cell, lead dioxide is deposited on the positive electrode and spongy lead is deposited on the negative electrode. However, if during the charging process, a current in excess of a characteristic maximum current is applied to the battery, electrolysis, generally referred to as "gassing", also occurs whereby water in the electrolyte decomposes into its component elements, hydrogen and oxygen. The level of this characteristic maximum current decreases exponentially as the cell becomes progressively more charged. Thus, the redepositing process is predominant during the initial stages of charging, but as the charging process continues, and the characteristic maximum current for the desired electrochemical redepositing process decreases, gassing (electrolysis) occurs more and more readily. During the later stages of charging, any current over a relatively low level will initiate gassing.

A number of problems are associated with the gassing (electrolysis). Excessive gassing can cause build-up of explosive gases (mixture of hydrogen and air) inside the top of the cell or in the vicinity of the cells. Accordingly, it is requisite that the cells be vented to avoid pressure build-up, and proper ventilation provided in the vicinity of the charging cells. Further, frequent replacement of water lost due to the electrolysis gassing is necessary. If the level of the electrolyte in the cell drops below the tops of the electrode plates, irrevocable damage to the plates can occur, drastically shortening battery life and capacity. In addition, the possibility of electrical short circuits and arcing (presenting an explosion hazard) are increased. Excessive gassing is also associated with excessive heat build-up in the cell, which is also detrimental to cell life. In addition, rapid gassing can cause splashing of acid which may be carried out of the cell. If unchecked, such acid splashing can cause corrosion and short circuiting between adjacent cells in battery packs.

It has also been found, however, that a certain amount of controlled gassing is beneficial. Slow passages of gas bubbles through the electrolyte serves to mix the electrolyte and to eleviate various effects of rapid charging. Specifically, sulfuric acid is generated during charging and the concentration of the acid tends to be increased adjacent to the portions of the electrode plates where the majority of the desired electrochemical reaction occurs. Stratification of acid concentration can reduce the available discharge rate. Slow passages of gas bubbles through the electrolyte serves to distribute the sulfuric acid generated. Similarly, if water has recently been added to the cell to maintain electrolyte level, the gas bubbles tend to mix the electrolyte, insuring maximum performance.

Accordingly, it is necessary to gradually reduce charging current during a fast charging of a cell or a battery of cells, but only to an extent which still allows a small amount of gassing to occur.

In general, charging systems wherein the charging rate is regulated in accordance with gas pressure produced by the cells during the charging process are known. Examples of such systems are described in U.S. Pat. Nos. 3,460,019 and 3,281,640 issued to J. A. Mas on Aug. 5, 1969 and Oct. 25, 1966, respectively. Such systems, however, utilize pressure transducers which present a resistance that is inversely proportional to gas pressure, i.e. the resistance decreases in response to increases in pressure. For example, the system described in the Mas U.S. Pat. No. 3,460,019 utilizes a pressure transducer which replaces the battery cell cap. A diaphragm is displaced by gas pressure in the cell to bring a carbon disc into progressive engagement with a set of contacts such that the resistance between the contacts descreases with increasing gas pressure. That is, the resistance of the sensor. The charging current is then controlled in accordance with the resistance.

The Mas U.S. Pat. No. 3,281,640 describes a transducer wherein a diaphragm is displaced by gas pressure in the cell to displace a pivotally mounted spring bias arm, which causes a contact arm to move with respect to a resistor, so that the resistance decreases with increasing pressure.

Such systems, however, are disadvantageous in that in the event of a break in the electrical connection from the transducer to the control circuit, the control circuit would perceive a (maximum) resistance which is indicative of minimum gas pressure. Accordingly, a maximum charging current would be applied to the battery cells.

Examples of other systems wherein the charging rate is regulated in accordance with some aspect of the charging process are described in U.S. Pat. No. 4,260,943 issued to A. Zaderej et al on Apr. 7, 1981; U.S. Pat. No. 4,203,065 issued to D. Whitford on May 13, 1980; and U.S. Pat. No. 3,584,285 issued to J. Goodkin et al on Jun. 8, 1971.

SUMMARY OF THE INVENTION

The present invention provides a battery charging system utilizing a gas pressure transducer which increases in resistance in response to increased gas pressure. The gas pressure transducer comprises an optical transducer. Respective rubber diaphragm chambers, communicating with the cells through glass and plastic tubing, are disposed to form a channel therebetween. A lightbulb and a photoresistor are placed at the respective ends of the channel. Increased gas pressure from the cells forces the center of the diaphragm closer together to restrict the channel region, and thus decrease the light received by the photoresistor as a function of gas pressure.

In accordance with another aspect of the invention, the transducer is interposed in a timing circuit for control of an SCR switch. The SCR controls the duty cycle of the charging current to the batteries being charged. More specifically, the transducer and a variable resistance cooperate with a capacitor to determine the time constant of the gate circuit of a unijunction transistor. The unijunction transistor is coupled through a transformer to the trigger of an SCR switch, which selectively couples the charger to the batteries. As gas pressure increases, the resistance of the transducer increases, increasing the time constant of the gate circuit. The SCR is thus made to fire for shortened periods of time, thereby decreasing the average charging current.

BRIEF DESCRIPTION OF THE DRAWING

A preferred exemplary embodiment of the present invention will hereinafter be described in conjunction with the appended drawing, wherein like numerals denote like elements and:

FIG. 2 is a block schematic of a battery charging system in accordance with the present invention.

DETAILED DESCRIPTION OF THE PREFERRED EXEMPLARY EMBODIMENT

Figure 1:
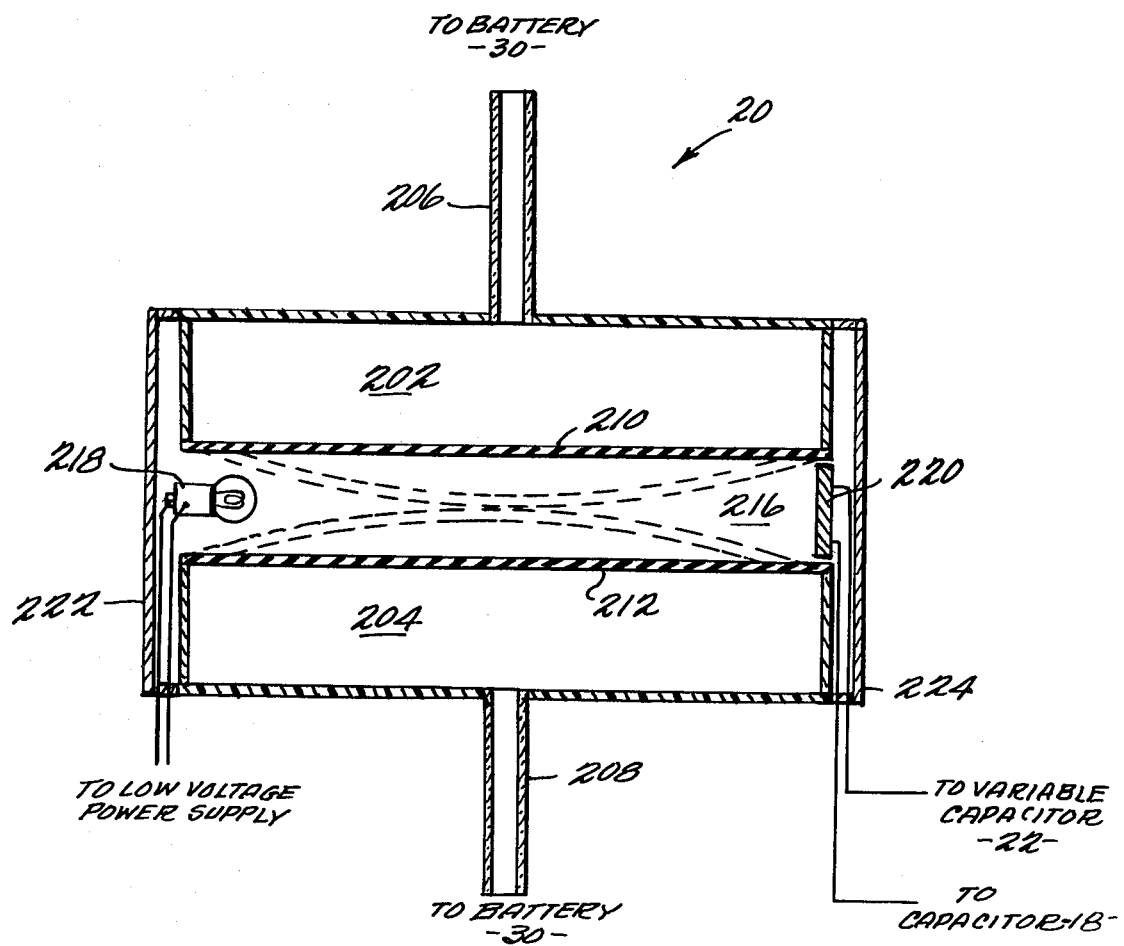
FIG. 1 is a sectional side view of an optical transducer in accordance with the present invention.

Referring now to FIGS. 1 and 2, a battery charging system 10 (FIG. 2) comprises: a diode 11; resistors 12 and 14; a unijunction transistor 16; a capacitor 18; a gas pressure transducer 20 in accordance with the present invention, manifesting a resistance directly proportional to gas pressure, i.e. the resistance increases with increasing gas pressure; a variable resistance 22; an isolation transformer 24; and an SCR 26.

As shown in FIG. 1, pressure transducer 20 comprises respective enclosures 202 and 204 communicating with battery cells 30 through suitable tubing 206 and 208. One side of enclosure 202 is formed of a suitable flexible diaphragm 210. Similarly, one side of enclosure 204 is formed of a flexible diaphragm 212. The remainder of enclosures 202 and 204 and suitably formed of a ⅛" thick polypropylene. Diaphragms 210 and 212 are suitably of 1" square dimensions, and may be formed of any nonreflective flexible material.

Enclosures 202 and 204 are relatively disposed so that diaphragms 210 and 212 are generally parallel and form a channel 216 therebetween. A lightbulb 218 and photoresistor 220 are disposed at either end of channel 216. The relative disposition of enclosures 202 and 204, lightbulb 218 and photoresistor 220 is suitably maintained by darkened back plates 222 and 224. Back plates 222 and 224 insure that essentially no ambient light is admitted into channel 216.

In operation, generation of gas in battery cells 30 is communicated to enclosures 202 and 204 through tubing 206 and 208, and causes increased pressure within enclosures 202 and 204. Increased pressure in enclosures 202 and 204 causes diaphragms 210 and 212 to bulge or stretch outwardly, decreasing the width, and ultimately closing off, channel 216. The resistance of photoresistor 220 is inversely proportional to the total illumination impinging on photoresistor. Accordingly, when the interior of enclosure 202 and 204 are at atmospheric pressure, (i.e. no pressure generated by gas from batteries 30) diaphragms 210 and 212 are in a relaxed state as shown in solid lines in FIG. 2. Accordingly, the entire surface of photoresistor 220 is illuminated by lightbulb 218. However, when generation of gas by battery cells 30 increases the pressure within enclosure 202 and 204, diaphragms 210 and 212 bulge outwardly to constrict channel 216, and diminish the total illumination of photoresistor 220, causing the resistance thereof to increase.

When the pressure from the gases generated by battery cells 30 reach a predetermined level, diaphragms 210 and 212 come together to pinch off channel 16 so that virtually no light is received by the photoresistor. Thus, the resistance of photoresistor 220 can be made to vary substantially linearly with the pressure generated in the cells.

The long delay between an increase in current and the resultant formation of gas, and increased pressure (which would then decrease the current) insures that rapid osillations of the diaphragm will not occur. In addition, further damping is provided by the air in enclosures 202 and 204 and the characteristics of the diaphragm itself. The damping characteristics of the diaphragm can be altered by stretching or by incorporating a fine needle valve in contact with the center of the diaphragm.

It should be appreciated that the transducer of FIG. 2 is particularly suited for use in a battery charging system. The range of resistances of transducer 20 can be varied over a wide range by selecting the particular photoresistor or phototransistor, by selection of a particular light source, and by varying the input power to the light source. In addition, the only movable parts in assembly are diaphragms 210 and 212. Thus, the assembly is simple and relatively inexpensive. Long life can be insured by utilizing the type of rubber normally employed in moveable diaphragms and powering the light source with a voltage below the rated voltage of the source. Further, since there is no gas flow through the unit, the effect of acid spray on the light source and photoresistor will be negligible. In addition, it has been found that transducer 20 is generally insensitive to shock or vibration, and displays negligible hysteresis. Acceleration forces have no net effect on the output of the sensor in view of the differential mounting of the respective diaphragms. In addition, transducer 20 can be mounted in any orientation.

Figure 3:
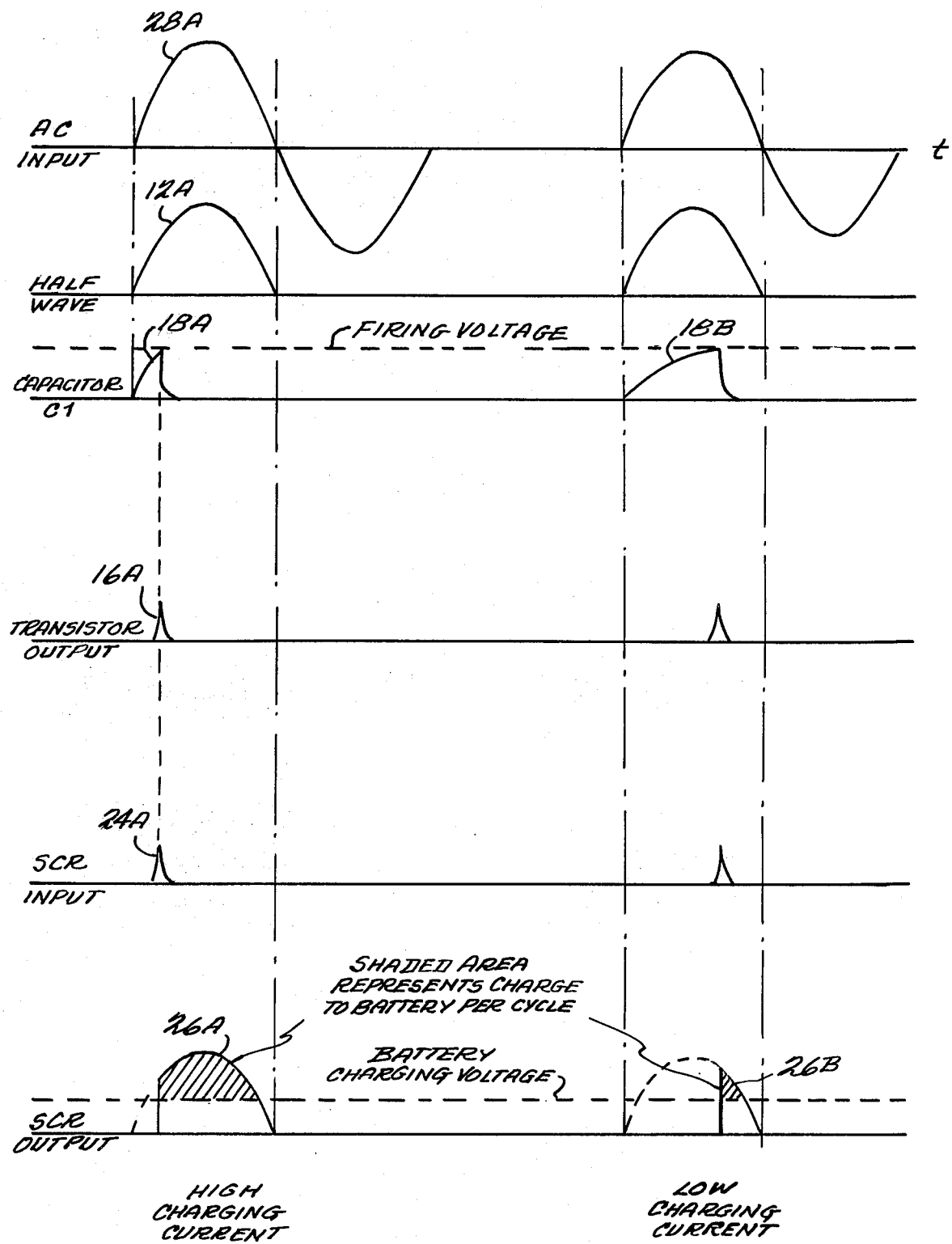
FIG. 3 is a diagram of the various signals in the system of FIG. 1.

Referring now to FIGS. 2 and 3, battery charger 10 is receptive of an AC signal 28A from a suitable AC power supply 28. The hot line from the AC power supply 28 is coupled to the anode of diode 11 and the anode of SCR 26. The neutral line of AC supply 28 is coupled to a first plate of capacitor 18 and to one terminal of the primary coil of transformer 24. The neutral terminal of AC supply 28 is also connected to the negative terminal of the battery cells 30 being charged.

Diode 11 and resistor 12 operate as halfwave rectifiers, to provide a suitable low voltage (halfwave rectified) DC signal 12A (FIG. 3) to transducer 20, capacitor 18 and transistor 16. Halfwave signal 12A is applied through variable resistor 22 and the resistance element of transducer 20, to the second plate of capacitor 18, and, through resistor 14, to the drain of transistor 16. The juncture of capacitor 18 and transducer 20 is connected to the gate of unijunction transistor 16. The first plate of capacitor C1 is connected, through the primary coil of transformer 24 to the source of transistor 16. As will hereinafter be explained, capacitor 18 is controllably charged to selectively render transistor 16 conductive, inducing a current in the secondary coil of transformer 24 to fire SCR 26.

SCR 26 is used to selectively provide a halfwave rectified charging current to battery 30. As previously noted, the anode of SCR 26 is connected to the hot terminal of AC supply 28. The cathode of SCR 26 is coupled to the positive terminal of battery cells 30. The gate of SCR 26 is coupled through the secondary core of transformer 24 to the positive terminal of battery cells 30.

In operation, unijunction transistor 16 is selectively rendered conductive at a relative time within a half cycle of halfwave signal 12A, in accordance with the resistance of transducer 20. More specifically, during the halfwave of signal 12A, (FIG. 2). Capacitor 18 accumulates a voltage 18A (FIG. 3), in accordance with an RC time constant determined by the resistance of transducer 20 and variable resistance 22. Specifically, the charging time constant T is equal to the product of the capacitance (C1) of capacitor 18 times the sum of the resistances of transducer 20 (RT) and variable resistor (RV) (T=C1(RT+RV)). However, when the voltage 18A on capacitor 18 reaches the firing level of unijunction transistor 16, transistor 16 is rendered conductive, completing a current path through the primary of transformer 24. Capacitor 18 therefore discharges, and a pulse 16A, (FIG. 3) is passed through the primary coil of transformer 24, inducing a concomitant pulse 24A in the secondary coil of the transformer.

Pulse 24A is applied to the control electrode (gate) of SCR 26 to selectively render the SCR conductive. An SCR is a semiconductor device which is non-conductive when reverse biased, and when forward biased, is normally non-conductive, but can be triggered into a conductive state by application of a trigger pulse to the control electrode (gate) thereof. The SCR thereafter remains in a conductive state until either the current therethrough drops below a predetermined level, or the device is reverse biased. During the half cycle of signal 12A, SCR 26 is forward biased by AC signal 28A. Accordingly, SCR 26 is rendered conductive upon application of trigger pulse 24A. However, at the end of the half cycle, the polarity of AC signal 28A reverses, reverse biasing SCR 26 and rendering it non-conductive. Thus, SCR 26 provides charging current 26A (FIG. 3) to battery 30 only during the time period between the firing of transistor 16 and the end of the half cycle of AC signal 28A. Battery 30 is charged by that portion of signal 26A greater than the requisite battery charging voltage (shown shaded in FIG. 3).

The effective duty cycle of signal 26A (and thus the average charging current to battery 30), decreases in response to increased gas pressure as sensed by transducer 20. The resistance of transducer 20 is directly proportional to gas pressure. Accordingly, an increase in gas pressure is reflected as an increase in the resistance of transducer 20, increasing the RC time constant of capacitor 18. Therefore, a longer period of time from the inception of the halfwave of signal 12A is required for the voltage accumulated by capacitor 18 to reach the firing level of unijunction transistor 16 (see waveform 18B in FIG. 3). SCR 26 is thus rendered conductive for a shorter percentage of the positive half cycle of AC signal 28, (see waveform 26B in FIG. 3) and the average charging current to battery 30 is decreased.

It will be understood that the above description is of preferred exemplary embodiments of the present invention and that the invention is not limited to the specific form shown. For example, additional circuitry can be added to system 10 to provide for predetermined voltage and current limits, etc. These and other modifications may be made in the design and arrangement of the elements without departing from the spirit of the invention as expressed in the appended claims.

What is claimed is:

1. A battery charging system of the type including a pressure transducer which manifests a varying resistance in accordance with the pressure of gases generated by the battery cells; and circuit means, responsive to said transducer resistance for, generating a charging current to said battery having an average value in accordance with said pressure; the improvement wherein said pressure transducer comprises:
    first and second enclosures;
    a first flexible diaphragm, disposed in a wall of said first enclosure;
    a second flexible diaphragm disposed in one wall of said second enclosure;
    means for relatively disposing said diaphragms in opposition to form a channel therebetween;
    means for excluding ambient light from said channel;
    a light source disposed at one end of said channel; and
    photosensitive means for presenting a resistance value inversely proportional to total illumination impinging thereon, disposed at the other end of said channel;
    means for communicating gas generated by said battery to said enclosures such that increases in said pressure cause said diaphragms to expand toward each other into said channel, decreasing the total illumination impinging on said photosensitive means and increasing the resistance thereof in accordance with said increase in said pressure.

2. In the system of claim 1, the further improvement wherein said circuit means comprises:
    switching means, responsive to alternating current (AC) signals and trigger signals applied thereto, for selectively applying portions of said AC signal to said battery as said charging current, said means being enabled for conduction in response to said trigger signal during half cycles of said AC signal of a first polarity and rendered non-conductive in response to half cycles of a second polarity;
    halfwave rectifier means, for generating halfwave signal corresponding to said AC signal half cycles of said first polarity;
    a capacitor, cooperating with said transducer photosensitive means, for accumulating a voltage in accordance with a time constant dependent upon the resistance value of said photosensitive means;
    trigger circuit means, responsive to said accumulated voltage, for generating said trigger signal when said accumulated voltage reaches a predetermined level.

3. The system of claim 2 wherein:
    said switching means comprises an SCR; and
    said halfwave rectifier means comprises a diode.

4. The system of claim 3 wherein:
    said trigger circuit means comprises a unijunction transistor.

5. In the system of claim 1 the further improvement wherein said circuit means comprises:
    an SCR, responsive to an AC signal and a trigger signal applied thereto, said SCR being enabled to selectively apply said charging current to said battery in response to said trigger signal during half cycles of said AC signal of a first polarity, and inhibited from applying said charging current during half cycles of said AC signal of a second polarity;
    a halfwave rectifier for generating halfwave rectified signals corresponding to said AC signal cycles of said first polarity;
    a capacitor, responsive to said halfwave rectified signals and coupled to said transducer photosensitive means, for accumulating a voltage during said halfwave rectified signal with a time constant proportional to said photosensitive means resistance; and means including a transistor switch and responsive to said accumulated voltage, for generating said trigger pulse to said SCR when said accumulated voltage reaches a predetermined level.

* * * * *